United States Patent [19]
Ichikawa

[11] Patent Number: 4,880,274
[45] Date of Patent: Nov. 14, 1989

[54] POWER RECLINING DEVICE OF SEAT
[75] Inventor: Kenji Ichikawa, Kanagawa, Japan
[73] Assignee: Ikeda Bussan Co., Ltd., Ayase, Japan
[21] Appl. No.: 202,010
[22] Filed: Jun. 2, 1988
[30] Foreign Application Priority Data
   Jul. 31, 1987 [JP] Japan .......................... 62-117858[U]
[51] Int. Cl.$^4$ .............................................. A47C 1/025
[52] U.S. Cl. .................. 297/362; 74/421 A; 74/425
[58] Field of Search ............. 297/362; 74/421 A, 425, 74/606 R

[56] References Cited
U.S. PATENT DOCUMENTS

| | | | |
|---|---|---|---|
| 3,087,078 | 4/1963 | Brown | 74/421 A X |
| 3,398,590 | 8/1968 | Campbell et al. | 74/425 X |
| 3,765,260 | 10/1973 | Lucas et al. | 74/425 X |
| 4,195,881 | 4/1980 | Klüting et al. | 297/362 X |
| 4,225,182 | 9/1980 | Werner | 297/362 |
| 4,655,099 | 4/1987 | Hansen | 74/421 A |
| 4,742,726 | 5/1988 | Adam et al. | 74/425 |

FOREIGN PATENT DOCUMENTS
2179997 3/1987 United Kingdom ................ 297/362

Primary Examiner—Peter A. Aschenbrenner
Attorney, Agent, or Firm—Foley & Lardner, Schwartz, Jeffery, Schwaab, Mack, Blumenthal & Evans

[57] ABSTRACT

A power reclining device for a seat is disclosed which comprises a base plate secured to a seat cushion; a pivoting arm secured to a seatback, the pivoting arm being pivotally connected to the base plate; a reduction gear mechanism arranged between the base plate and the pivoting arm, the reduction gear mechanism pivoting the pivoting arm at a reduced speed when actuated; an electric motor unit for actuating the reduction gear mechanism when electrically energized; connecting means for detachably connecting the electric motor unit to a given portion of the base plate; and positioning means for positioning the electric motor unit with respect to the given portion of the base plate before connecting the electric motor unit to the base plate.

5 Claims, 2 Drawing Sheets

POWER RECLINING DEVICE OF SEAT

BACKGROUND OF THE INVENTION

1. Field of the Invention

The present invention relates in general to a reclining device of a seat, and more particularly to a power reclining device which is designed to adjust an angular position of a seatback relative to a seat cushion by the power of an electric motor.

2. Description of the Prior Art

Hitherto, various power reclining devices have been proposed and put into practical use. Some of them are of a type which comprises a pivoting mechanism for pivoting a seatback relative to a seat cushion, an electric motor unit for powering the pivoting mechanism and a reduction gear mechanism for controlling the operation speed of the pivoting mechanism. In this type, the electric motor unit has an output gear which is brought into engagement with an input gear of the reduction gear mechanism upon assembly of the reclining device. That is, after achieving a precise positioning of the motor unit relative to the reduction gear mechanism which has been assembled in the pivoting mechanism, the motor unit is secured to a given portion of the pivoting mechanism by means of some bolts.

However, due to the inherency in construction, the work for properly positioning the motor unit before bolting the same to the given portion is difficult or at least troublesome. In fact, if the proper positioning fails, smooth bolt insertion to the corresponding bolts holes is not achieved. Thus, hitherto, the work for properly positioning the motor unit has required a skilled manual laborer.

SUMMARY OF THE INVENTION

It is therefore an object of the present invention to provide a power reclining device which is free of the above-mentioned drawback.

According to the present invention, there is provided a power reclining device in which the positioning of an electric motor unit relative to a reduction gear mechanism can be assuredly and precisely made.

According to the present invention, there is provided, in a seat having a seat cushion and a seatback which is pivotal relative to the seat cushion, an improved power reclining device. The power reclining device comprises a base plate secured to the seat cushion; a pivoting arm secured to the seatback, the pivoting arm being pivotally connected to the base plate; a reduction gear mechanism arranged between the base plate and the pivoting arm, the reduction gear mechanism pivoting the pivoting arm at a reduced speed when actuated; an electric motor unit for actuating the reduction gear mechanism when electrically energized; connecting means for detachably connecting the electric motor unit to a given portion of the base plate; and positioning means for positioning the electric motor unit with respect to the given portion of the base plate before connecting the electric motor unit to the base plate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 2:
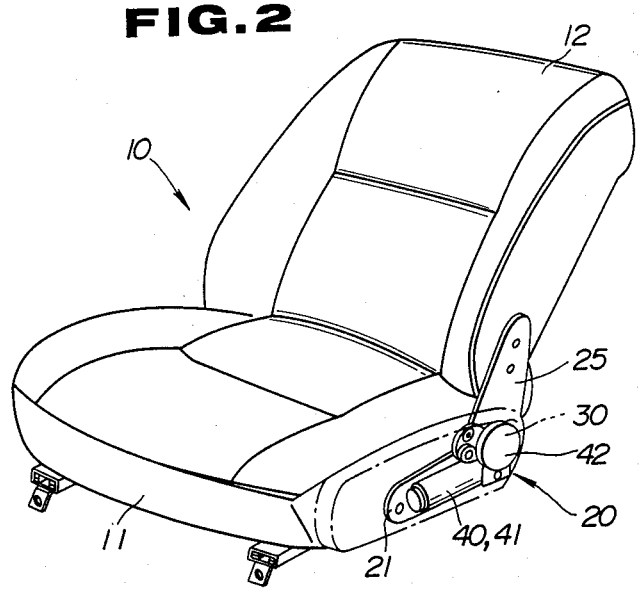
FIG. 2 is a perspective view of an automotive seat to which the power reclining device of the present invention is practically applied.

Referring to FIG. 2 of the accompanying drawings, there is shown an automotive seat 10 to which a power reclining device 20 according to the present invention is practically mounted.

The seat 10 shown comprises a seat cushion 11 and a seatback 12 which is pivotally connected to the seat cushion 11 through the power reclining device 20. As will become apparent as the description proceeds, the power reclining device 20 pivots the seatback 12 to a desired angular position relative to the seat cushion 11 by electric power.

Figure 1:
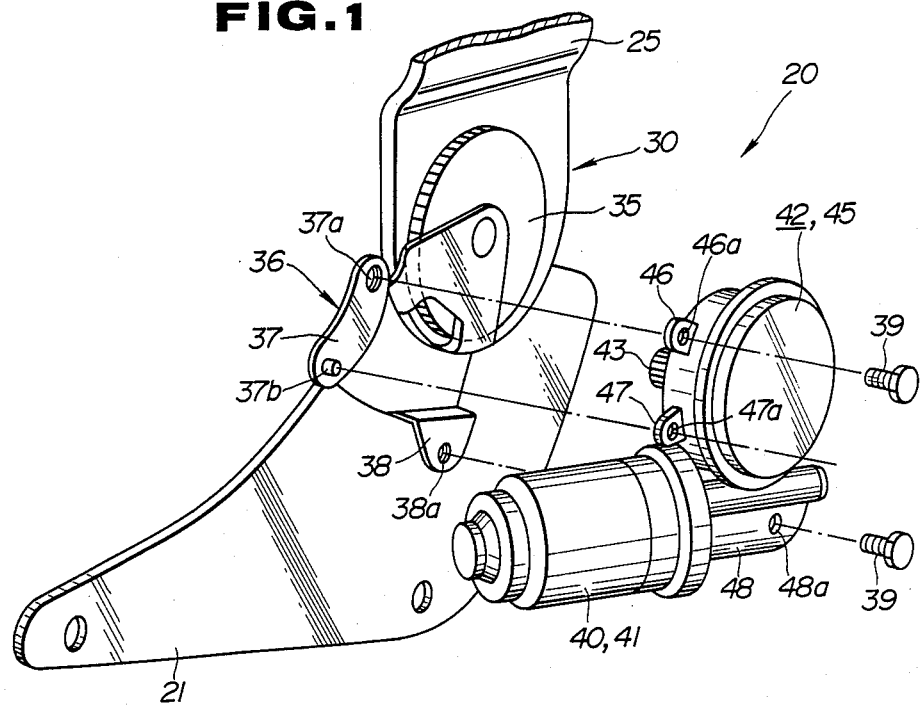
FIG. 1 is an exploded view of a power reclining device according to the present invention.

As is best seen from FIG. 1, the power reclining device 20 comprises generally a base plate 21, a pivoting arm 25 pivotally connected to the base plate 21, a reduction gear mechanism 30 and an electric motor 40.

The base plate 21 is secured to the seat cushion 11 and the pivoting arm 25 is secured to the seatback 12, so that the seatback 12 is pivotal relative to the seat cushion 11. As is shown in FIG. 3, a return spring 26 is disposed between the base plate 21 and the pivoting arm 25 to bias the seatback 12 rearward, that is, in a direction away from the seat cushion 11.

Figure 3:
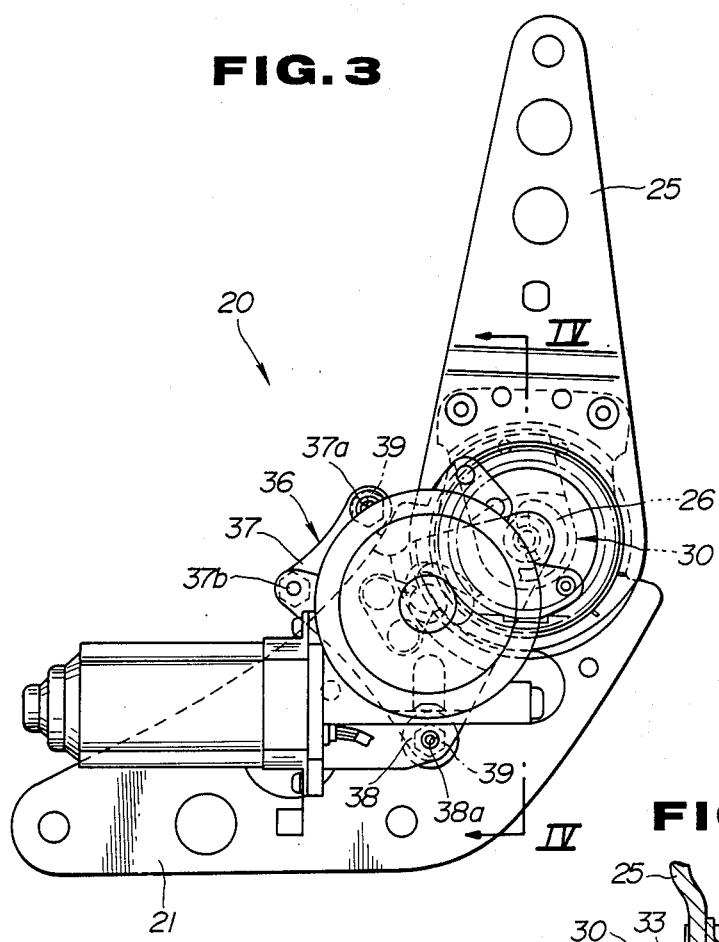
FIG. 3 front view of the power reclining device of the invention.
Figure 4:
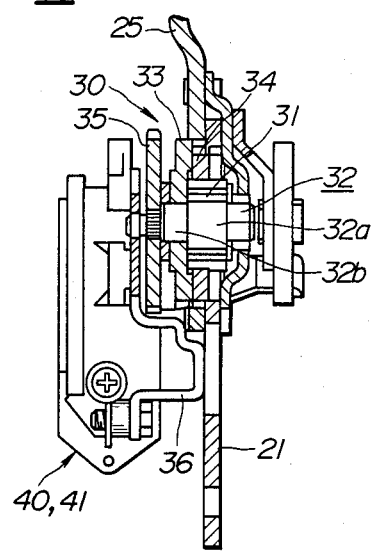
FIG. 4 is a sectional view taken along the line IV—IV of FIG. 3.

As is seen from FIGS. 3 and 4, the reduction gear mechanism 30 comprises a shaft 32 which has a concentric middle portion 32a rotatably held by the base plate 21 through a roller bearing 31 and an eccentric portion 32b rotatably held by the pivoting arm 25. An internal gear 33 is secured to the pivoting arm 25 in a manner to be concentric with the eccentric portion 32b of the shaft 32. An external gear 34 is concentrically disposed about the roller bearing 31 having some external teeth thereof operatively engaged, with the internal teeth of the external gear 34. The external gear 34 is connected to the base plate 21. The number of the teeth of the internal gear 33 is greater than that of the external gear 34 by one or two. An input gear 35 is secured to an inboard end portion of the shaft 32 in a manner to be concentric with the concentric middle portion 32a. The inboard end of the shaft 32 is rotatably held by a mounting plate 36 which is secured to the base plate 21. As will be described in detail hereinafter, when the input gear 35 is turned in one direction about its axis, the internal gear 33 runs about the external gear 34 thereby to slowly pivot the pivoting arm 25 relative to the base plate 21. Thus, the seatback 12 is slowly pivoted forward or rearward relative to the seat cushion 11.

As is seen in FIG. 1, the mounting plate 36 is formed with supporting portions 37 and 38 each having a threaded opening 37a or 38a formed therethrough. The supporting portion 37 is formed with a positioning pin 37b which extends outward.

Securely mounted to the mounting plate 36 is an electric motor unit 41 which comprises a monolithic housing 42. The housing 42 has one part in which an electric motor 40 is assembled. The housing 42 has an annular receptacle portion 45 integrally formed thereon. A drive shaft 43 (or output gear) with a gear formed thereabout is projected from a central portion of the annular receptacle portion 45. A known transmission mechanism is installed in the receptacle portion 45 to transmit the power of the electric motor 40 to the drive shaft 43.

Two perforated lugs 46 and 47 are integrally formed on a cylindrical outer wall of the receptacle portion 45, each being formed with an opening 46a or 47a. It is to be noted that the opening 47a of the lug 47 is sized to match with the positioning pin 37b formed on the supporting portion 37 of the mounting plate 36. A flange 48 is integrally formed on the housing 42, which has an opening 48a provided therethrough.

As is understood from FIG. 1, during assembly, the electric motor unit 41 is brought to the mounting plate 36 putting the positioning pin 37b into the opening 47a of the lug 47. Then, the electric motor unit 41 is somewhat moved or pivoted to a proper position wherein the threaded openings 37a and 38a of the mounting plate 36 are just mated with the openings 46a and 48a of the motor unit 41 respectively. Upon this, the geared drive shaft 43 becomes properly engaged with the input gear 35 of the reduction gear mechanism 30. Then, connecting bolts 39 and 39 are inserted into the mated openings 46a and 37a (and 47a and 38a) and screwed to tightly engage with the threaded openings 37a and 38a. With this, the electric motor unit 41 is tightly and precisely mounted to the mounting plate 36, that is, to the seatback pivoting mechanism.

When, in operation, the electric motor 40 is energized, the power of the motor 40 is transmitted through the geared drive shaft 43 to the input gear 35 and thus the shaft 32 of the reduction gear mechanism 30 to turn the same in a certain direction. The rotation of the shaft 32 causes the internal gear 33 to run about the external gear 34 due to rotation of the eccentric portion 32b about the axis of the shaft 32. Because of the difference in number of the teeth between the internal gear 33 and the external gear 34, the internal gear 33 turns about its axis very slowly as compared with the running speed about the external gear 34.

The turning of the internal gear 33 about its axis means a pivoting movement of the pivoting arm 25 which is secured to the seatback 12. Thus, upon energization of the electric motor 40, the seatback 12 is pivoted slowly forward or rearward.

When the electric motor 40 is deenergized, the seatback 12 stops at an angular position. Under this stopped condition, the seatback 12 does not move even when the same is applied with an external force. This is because of the great speed reduction ratio possessed by the reduction gear mechanism 30. Thus, the seatback 12 is kept at a desired position as long as the electric motor 40 is deenergized.

Although the above-description is directed to an embodiment in which only two connecting bolts 39 are used for connecting the electric motor unit 41 to the reclining mechanism, more than two bolts may be used for assuring the connection. Furthermore, in place of the reduction gear mechanism 30 as described hereinabove, other types of reduction mechanisms are also usable in the present invention.

As will be understood from the above description, the power reclining device of the present invention employs a positioning pin 37b for facilitating proper mounting of the electric motor unit 41 to the reclining mechanism. Thus, assembly of the power reclining device is easily and assuredly made. The proper positioning of the electric motor unit 41 induces an assured engagement between the geared drive shaft 43 of the unit 41 and the input gear 35 of the reduction gear mechanism 30.

What is claimed is:

1. In a seat having a seat cushion and a seatback which is pivotal relative to said seat cushion,
a power reclining device comprising:
a base plate secured to said seat cushion;
a pivoting arm secured to said seatback, said pivoting arm being pivotally connected to said base plate;
a reduction gear mechanism arranged between said base plate and said pivoting arm, said reduction gear mechanism pivoting said pivoting arm at a reduced speed when actuated;
an electric motor unit for actuating said reduction gear mechanism when electrically energized;
connecting means for detachably connecting said electric motor unit to a given portion of said base plate; and
positioning means for positioning said electric motor unit with respect to said given portion of said base plate before connecting said electric motor unit to said base plate,
wherein said positioning means comprises a mounting plate which is formed with two threaded openings and a positioning pin, and three separate portions formed on said electric motor unit and having respective openings which are mated with said two threaded openings and said positioning pin respectively upon proper mounting of said electric motor unit to said base plate.

2. In a seat having a seat cushion and a seatback which is pivotal relative to said seat cushion,
a power reclining device comprising:
a base plate secured to said seat cushion;
a pivoting arm secured to said seatback, said pivoting arm being pivotally connected to said base plate;
a reduction gear mechanism arranged between said base plate and said pivoting arm, said reduction gear mechanism having an input gear for pivoting said pivoting arm about a pivot axis at a reduced speed when actuated;
an electric motor unit having a geared drive shaft engageable with said input gear for actuating said reduction gear mechanism when electrically energized;
connecting means for detachably connecting said electric motor unit to a given portion of said base plate; and
positioning means spaced from said pivot axis for positioning said electric motor unit with respect to said given portion of said base plate and said geared drive shaft with the periphery of said input gear before connecting said electric motor unit to said base plate,
wherein said positioning means comprises a mounting plate which is formed with two threaded openings and a positioning pin, and three separate portions formed on said electric motor unit and having respective openings which are mated with said two threaded openings and said positioning pin respectively upon proper mounting of said electric motor unit to said base plate.

3. A power reclining device as claimed in claim 2, in which said electric motor unit comprises:

a monolithic housing having first and second receptacle parts which are integrally connected through an intermediate portion disposed therebetween;
an electric motor installed in said first receptacle part;
a transmission mechanism installed in said second receptacle part, said transmission mechanism having said geared drive shaft projected outwardly from said second receptacle part.

4. A power reclining device as claimed in claim 2, wherein the two threaded openings and the positioning pin on said mounting plate are in a non-linear orientation to thereby define apices of a triangle.

5. A power reclining device as claimed in claim 2, wherein said positioning pin is sized to snugly fit into one of the openings on said electric motor unit.

* * * * *